US005280220A

United States Patent [19]

Carter

[11] Patent Number: 5,280,220

[45] Date of Patent: Jan. 18, 1994

[54] REMOTE CONTROLLED, SOLAR AND BATTERY POWERED LIGHTS

[76] Inventor: Gary Carter, #2 Hickory St., Box 15, Charlottesville, Va. 22901

[21] Appl. No.: 648,996

[22] Filed: Jan. 31, 1991

Related U.S. Application Data

[63] Continuation-in-part of Ser. No. 241,335, Oct. 5, 1988, abandoned.

[51] Int. Cl.[5] ........................ H05B 37/00; G01V 9/04

[52] U.S. Cl. .................................... 315/152; 315/157; 315/159; 250/214 AL

[58] Field of Search ............... 315/152, 150, 156, 157, 315/159; 250/214 R; 214 AL; 340/825.72, 825.71; 455/352

[56] References Cited

U.S. PATENT DOCUMENTS 3,534,351 10/1970 Harnden, Jr. et al. ......... 250/214 R
4,091,276 5/1978 Lebovici ......................... 315/157 X
4,114,099 9/1978 Hollander .................. 340/825.72 X
4,305,006 12/1981 Walthall et al. ................ 315/156 X
4,663,521 5/1987 Maile ............................ 250/214 AL
4,686,380 8/1987 Angott ....................... 340/825.72 X
4,866,580 9/1989 Blackerby ........................... 362/205

*Primary Examiner*—Eugene R. LaRoche
*Assistant Examiner*—Son Dinh
*Attorney, Agent, or Firm*—Jones, Tullar & Cooper

[57] ABSTRACT

An electrical device such as a lamp is energized and deenergized remotely by a system in which pulses of different duration are transmitted to a receiver unit capable of discriminating between the length of the pulses in order to switch between an "on" mode and an "off" mode. A battery energizing the receiver unit is recharged by a photovoltaic cell. Advantageously associated with the battery charging circuit is an ambient lights sensing device capable of interrupting current from the battery to a load whenever the battery is being charged by the photovoltaic cell.

14 Claims, 7 Drawing Sheets

REMOTE CONTROLLED, SOLAR AND BATTERY POWERED LIGHTS

CROSS REFERENCE TO A RELATED APPLICATION

This application is a continuation-in-part of my copending application for U.S. patent, Ser. No. 241,335, filed Oct. 5, 1988 abandoned.

BACKGROUND OF THE INVENTION

1. Field of the Invention

This invention relates generally to the control of electrical loads such as lamps, and more particularly to the remote and the ambient light control of lighted Christmas tree ornaments, and the like.

2. Description of the Prior Art

Light displays have long been very popular to help celebrate special occasions and major holidays, particularly the Christmas Holidays in the Christian world. Lights for this purpose conventionally are provided as a plurality of brightly colored lamps arranged in sockets strung on electrical wires. Anyone familiar with decorating a Christmas tree or creating an outdoor Christmas display is familiar with the hassle created by the necessity of arranging the wires so as to permit a suitable placement of the lamps without distracting from the appearance of the tree, house, or other structure, in the light of day. In addition, the insulation of the electrical wires often becomes frayed and broken with use, a situation that not only can limit the usefulness of a string of lights, but can create fire and shock hazards as well.

In view of the disadvantages of the conventional strung Christmas tree lights, and the like, it has been proposed to construct Christmas tree ornaments, and the like, having a self-contained power supply. While such an arrangement eliminates the need for the bothersome wires to be connected between the individual lamps, these lights never became popular because of the impracticality of manually controlling the operation of each individual lamp. When one considers the large number of lights normally used on Christmas trees and other light displays, it can be readily appreciated that it is not practical to be manually turning on and off say fifty or more lamps individually.

Accordingly, U.S. Pat. No. 4,866,580, issued Sep. 12, 1989, to C. Blackerby is directed to an ornamental lighting device that can be turned on and off by remote control. The remote control link is formed in this system by infrared light being transmitted to each of the lamps. A difficulty has been encountered with the use of light as a coupling between the remote control systems transmitter and individual receivers, however, inasmuch as some of the lamps may be behind a Christmas tree, for example, and not be in the line of sight of the transmitter, thus requiring a person operating the transmitter to move about in order to turn on or off all of the lamps in a display.

This brings about another difficulty with the conventional remote control systems for controlling lights on a Christmas tree, since repeated actuation of the transmitter will turn off lights already on, or turn on lights already off. U.S. Pat. No. 3,534,351, issued Oct. 13, 1970 to J. D. Harnden, Jr. et al discloses a light coupled remote control apparatus in which a bistable multivibrator is triggered each time it senses one of a series of uniform pulses. Such systems have made the use of self-powered, remotely-controlled lights for Christmas trees and other displays impractical until now.

SUMMARY OF THE INVENTION

An object of the present invention is to provide a remote control system for self-powered lights that permits individual lights not turned on to be turned on without turning off other lights already on, and to turn off individual lights that are on without turning on other lights already turned off.

Another object of the present invention is to provide an arrangement for recharging batteries of self-powered lights in order to substantially reduce the need for changing batteries in such lights.

Yet another object of the present invention is to provide self-powered lights that turn themselves off when a predetermined minimum level of ambient light is sensed, and will turn themselves back on again when the ambient light drops below the predetermined level.

These and other objects are achieved according to the present invention by providing apparatus for remotely-controlling an electrical load such as a lamp of a Christmas tree ornament in which the apparatus includes a transmitter capable of radiating energy pulses of vary lengths, and a receiver including a system for comparing the lengths of pulses received from the transmitter in order to position a bistable switch in one mode for pulses less than a predetermined length of duration, and for positioning the bistable switch in an opposite mode when detecting pulses greater than the predetermined duration. A rechargeable battery is associated with each individual receiver to normally power the receiver circuits and the lamps associated with them, and a photoelectric cell is connected to the battery for recharging same whenever ambient light conditions are sufficient to permit the photoelectric cell to generate an electric signal. A current detector is inserted between the photoelectric cell and the battery for sensing when a current is being generated by the photoelectric cell for turning the bistable switch to the mode de-energizing the associated lamp whenever the photoelectric cell is charging the battery of the receiver unit. Preferably, the level for which the current detector is set is selected to be consistent with turning off the individual lamps whenever a predetermined level of ambient light is sensed as to make the display of lights ineffective, and for turning the lights back on again whenever the ambient light drops below the predetermined level.

It is an advantage of the present invention that a practical system for providing self-powered display lights is provided which eliminates the need for electrical cords and wires between the individual lights and to a power source, eliminating user hassle commonly encountered with the use of conventional string electric Christmas tree lights and the like, as well as eliminating the fire and shock hazards commonly encountered with these conventional lighting systems.

Another advantage of the present invention is that the use of rechargeable batteries reduces the inconvenience of replacing batteries in the individual light units, and additionally reduces waste commonly encountered with throw-away batteries.

Another advantage of the present invention is that the demand for commercial electrical power is reduced.

Still another advantage of the present invention is that the problem with turning on or off only a portion of the lights in a display at a single actuation of the control transmitter is eliminated by permitting the receivers to distinguish between a "lamp on" and a "lamp off" command.

Yet another advantage of the present invention is that the lamps of the individual lights will be turned on and off as appropriate to ambient lighting conditions.

DESCRIPTION OF THE PREFERRED EMBODIMENTS

Figure 1:
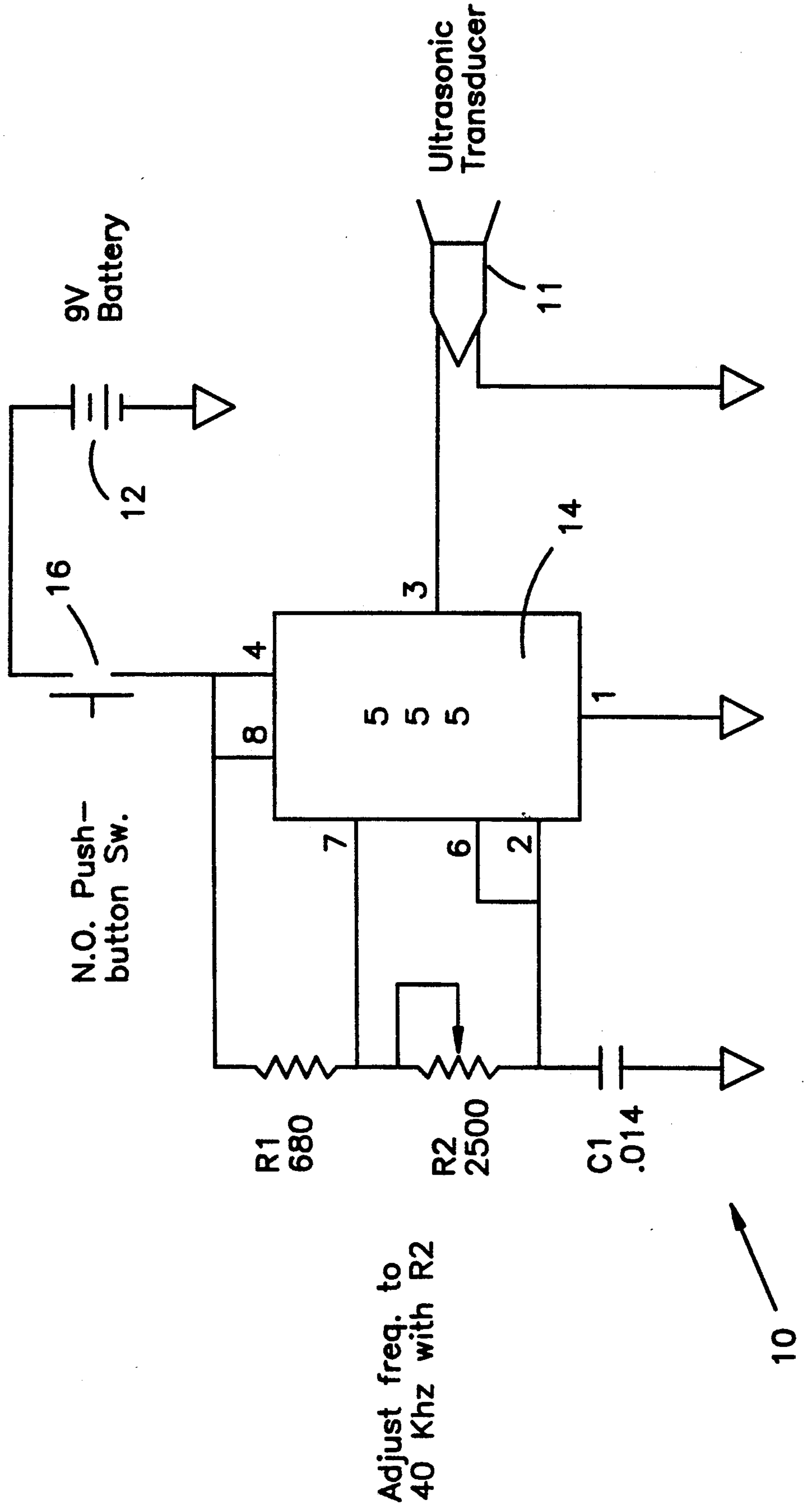
FIG. 1 is a schematic diagram showing an electrical circuit for a 40 khz ultrasonic transmitter for use in a remote control lighting system according to the present invention.

Referring now more particularly to FIG. 1 of the drawings, a transmitter 10 for a remote control system according to the present invention is provided for sending signals of varying lengths from an ultrasonic transducer 11. Such a transmitter can be purchased from Radio Shack under their Model No. 61-2661. Although transmitter 10 preferably is an ultrasonic generator and transducer, it is to be understood that other forms of radiation transmitters, such as infrared generators could be used if desired. The use of an ultrasonic generator, however, reduces many of the problems associated with blocking of various ones of the receiver units, such as those disposed on a side of a Christmas tree away from the transmitter, commonly encountered with light-coupling systems. Furthermore, in an ultrasonic system a simple ultrasonic "dog" whistle capable of producing the required ultrasonic frequency could even be used.

Ultrasonic transmitter 10 is a small hand-held device powered by a battery 12, which can be a conventional 9 volt battery and the like, which energizes an astable multivibrator 14 set to the resonant frequency of the narrow band ultrasonic transducer 11. Selective actuation of multivibrator 14 is permitted by insertion of a conventional push-buttons switch 16 between battery 12 and multivibrator 14. The ultrasonic transducer 11 emits a directional acoustical wave which will be received by an ultrasonic receiver to be described below.

A variable resister R2 is connected across multivibrator 14 so as to permit the frequency of multivibrator 14 to be adjusted to the resonant frequency of the transducer 11. In a working model of the transmitter 10, a frequency of 40 khz has been found satisfactory.

Figure 2:
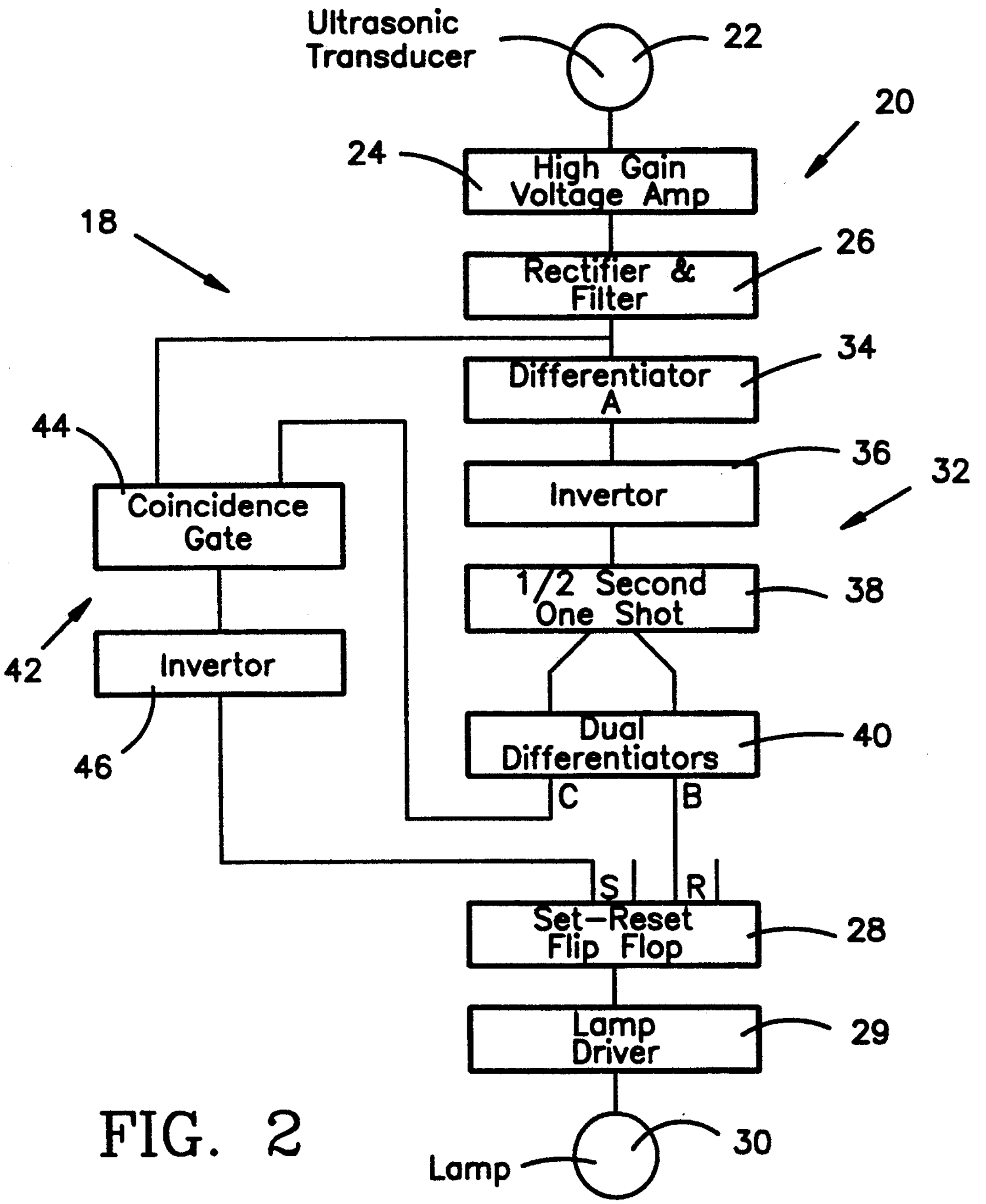
FIG. 2 is a block diagram of an ultrasonic receiver and the control circuit for use with a remote control lighting system according to the present invention.

Referring now more particularly to FIG. 2 of the drawings, a receiver circuit 18 in accordance with the present invention will now be described.

Ultrasonic acoustical waves generated by a transmitter 10 can be received by a transducer section 20 of a receiver circuit 18 through a narrow band ultrasonic transducer in the form of a conventional condenser microphone 22. The signal so received drives a high gain, class A voltage amplifier 24, of conventional construction. The output of the voltage amplifier 24 is rectified and filtered in a rectifier and filter circuit 26. Connected to circuit 26 by detection and comparison circuits to be described below is a conventional Reset-Set (R/S) bistable flip-flop 28 capable of oscillating between an "on" mode and an "off" mode. Connected to flip-flop 28 through a conventional lamp driver 29 is a lamp 30, which may be the lamp of a Christmas tree light or ornament.

Connected to the output of rectifier and filter circuit 26 is a detector section 32 of receiver circuit 18 also connected to flip-flop 28 for resetting same to the "off" mode thereof when a signal received from transmitter 10 last less than a predetermined length of time. Detector section 32 includes a differentiator 34 which emits a pulse at each transition of a pulse received from circuit 26 (FIG. 3) and sends such a pulse to an invertor 36 inserted between and connected to the differentiator 34 and a monostable multivibrator 38. The latter is capable of generating a signal of predetermined length only on receiving a pulse of a predetermined plurality from the differentiator 34. The detector section 32 further includes a dual differentiator 40 of conventional construction which is connected to the output of the multivibrator 38 and to the switch formed by flip-flop 28 for feeding a signal from the output marked "B" to the reset input of the flip-flop 28, and from an output "C" which forms one input to a comparison section 42.

Comparison section 42 is connected between the transducer section 20 and the switch formed by flip-flop 28 for setting the latter to the "on" mode thereof when a signal received from the transducer section 20 lasts longer than a predetermined length of time. For this purpose, the comparison section 42 includes a coincidence gate 44 having one input connected to the output of rectifier and filter circuit 26 and the other input connected to the output "C" of dual differentiator 40. In practice, the coincidence gate 44 can be formed by a conventional NAND-gate, as described below, the output of which is inverted by an invertor 46 before being fed to the SET input of flip-flop 28.

Figure 3:
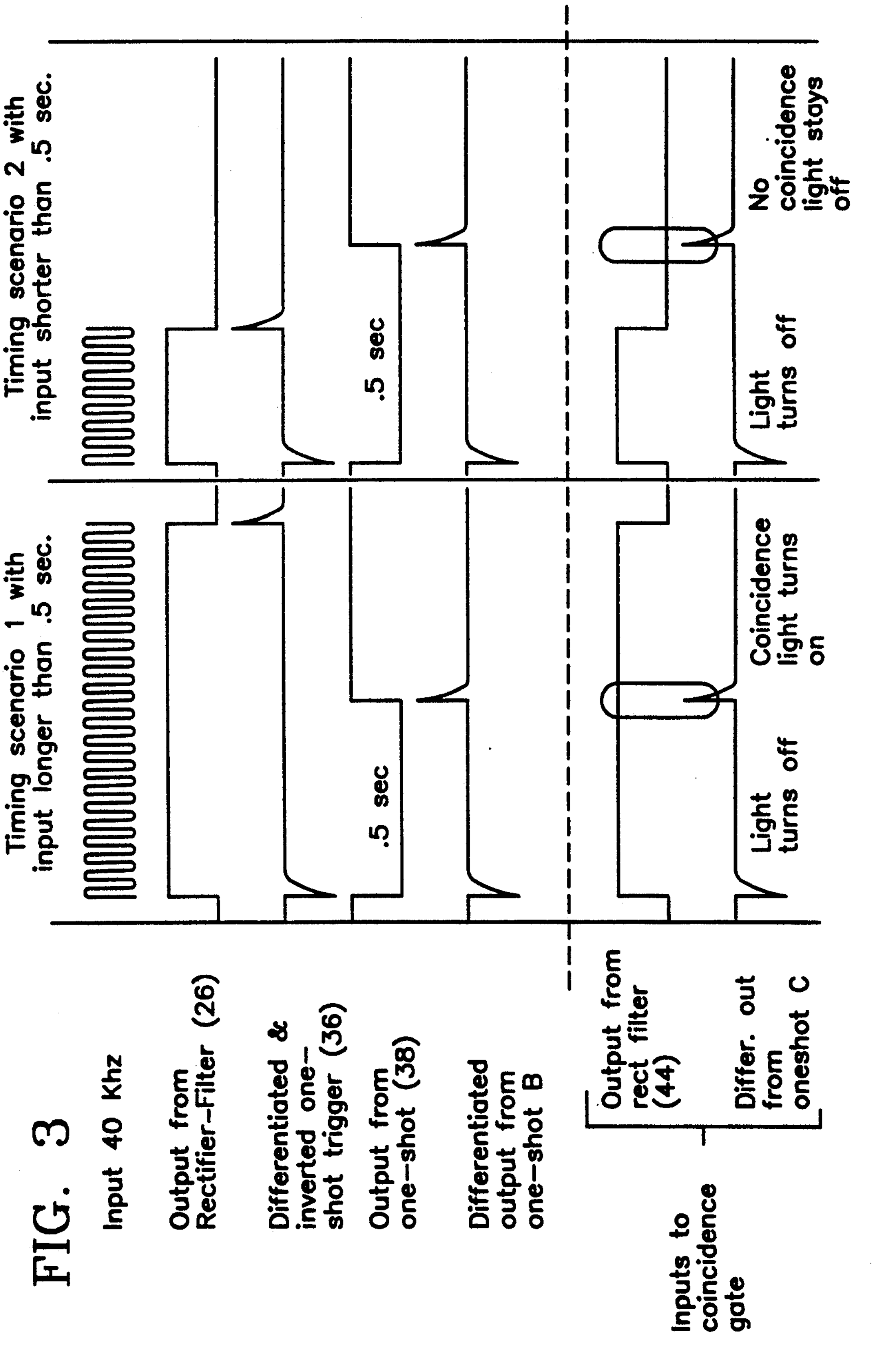
FIG. 3 is a timing chart showing the timing sequences of the receiver shown in FIG. 2 for examples of sonic pulses less than and greater than a predetermined time interval.

The operation of the receiver unit illustrated in FIG. 2 will now be described with reference to FIG. 3 of the drawings.

The ultrasonic acoustical waves are received by microphone 22, which can be a narrow band ultrasonic transducer. The transducer drives high gain, Class A voltage amplifier 24 into saturation. The output of the voltage amplifier 24 is rectified and filtered which changes the ultrasonic alternating current (AC) into a positive DC voltage, or positive going pulse with a duration, or pulse width, equal to the length of time the ultrasonic transmitter button is held down. This positive pulse is sent to two places, the coincidence gate 44 and differentiator 34 which creates a narrow positive pulse at time 0 in unison with the leading edge of the wider input pulse. The differentiator 34 also creates a narrow negative pulse in unison with the trailing edge of the input pulse; however, this narrow negative pulse is not used. Differentiator 34 drives invertor 36 where the narrow positive pulse at time 0 is changed to a narrow negative pulse at time 0. This narrow negative pulse triggers the monostable, or "one shot", multivibrator 38. The monostable multivibrator 38 creates a negative pulse beginning at time 0 and lasting for 500 milliseconds (ms) (½ second). This 500 ms negative pulse is fed to two separate differentiators B and C in block 40. The narrow negative pulse out of differentiator B which is in unison with the leading edge of the 500 ms pulse (time 0) resets bistable multivibrator 28. When the RS flip-flop 28 is reset it turns off the lamp driver 29 which in turn turns off the lamp 30. The narrow positive pulse out of differentiator B is not used. The output from differentiator C is connected to the coincidence gate 44. The narrow negative pulse from differentiator C is ignored by the coincidence gate 44. It is the narrow positive pulse from differentiator C which occurs 500 ms (or ½ second) after time 0 that the coincidence gate 44 uses. The coincidence gate 44 requires two positive input pulses simultaneously in order for an output to occur. If the output from the rectifier and filter 26 lasts longer than ½ second then it will coincide with the narrow positive pulse from differentiator C which will cause a positive pulse output from the coincidence gate 44. This positive output pulse is changed to a negative pulse by invertor 46. This negative pulse from invertor 46 sets the SR flip-flop 28 which turns on the lamp driver 29 thereby turning on the lamp 30. If the output from the rectifier and filter 26 lasts less than ½ second there will be no coincidence, the flip-flop 28 will remain reset, and the lamp 30 will remain off.

Figure 4:
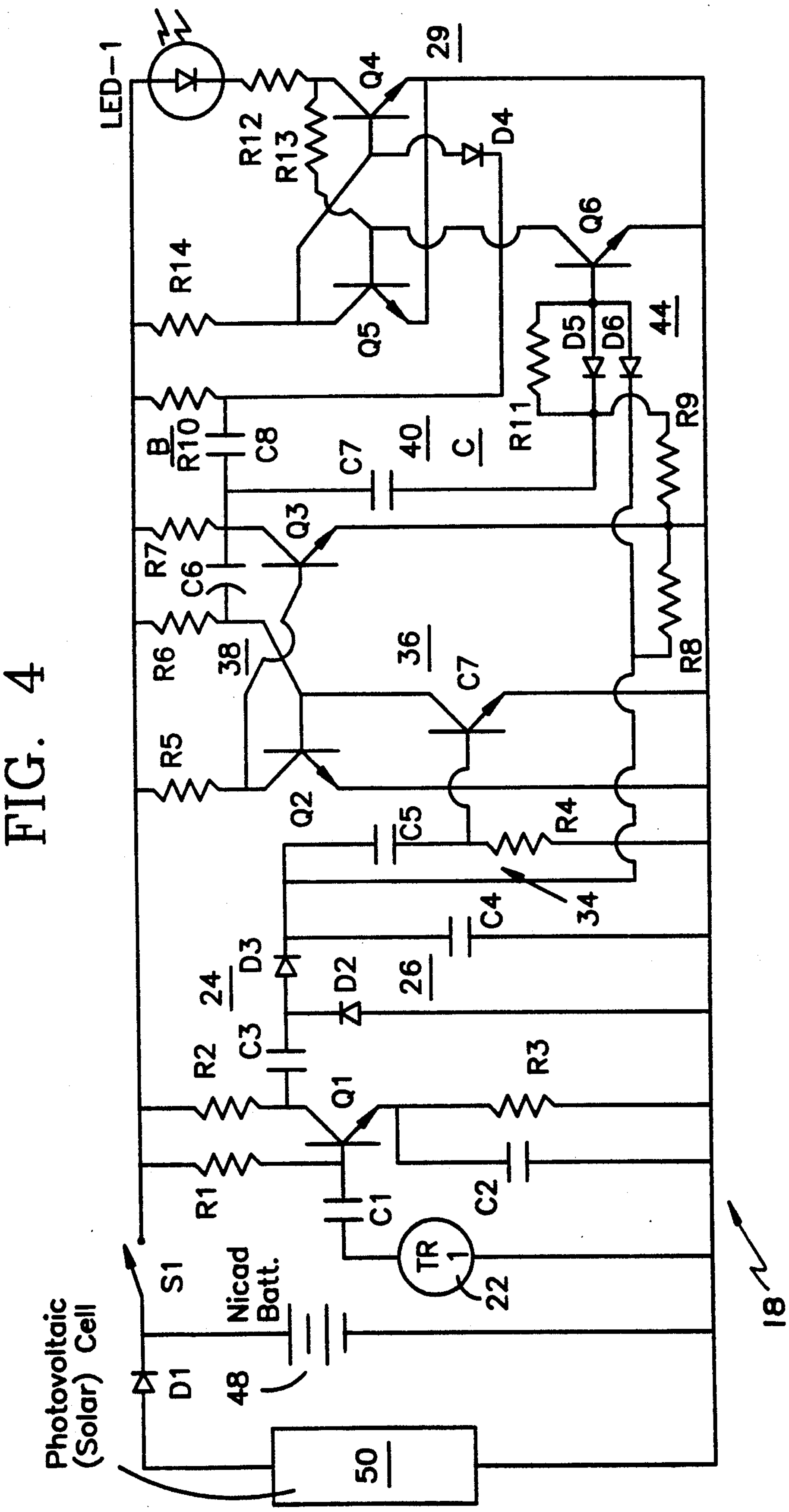
FIG. 4 is a schematic diagram of an ultrasonic receiver constructed in accordance with FIG. 2.

A first embodiment of the present invention constructed from discrete components is illustrated in FIG. 4. In this embodiment a conventional battery 48 is connected across a lamp 30 in the form of a suitable light emitting diode (LED). Connected across battery 48 is a suitable photovoltaic cell 50 capable of recharging battery 48 whenever ambient light is of a sufficient intensity.

For the following discussion reference is made to FIGS. 2 and 4.

For the prototype a 4.5 volt 150 milliampere hour battery 48 was selected along with one square inch of ceramic photovoltaic solar cell 50 which delivered 5 milliamperes of charging current in bright sunlight. Diode D1 keeps the battery 48 from discharging back into the solar cell 50 when there is insufficient light for solar cell output. D1 is a schottky barrier diode which is more efficient than a standard silicon diode due to its lower forward voltage drop. TR1 is a 40 kilohertz (khz) ultrasonic ceramic microphone 22 having a 2 khz band width. This narrow band width prevents various stray sounds and noises from accidentally activating the device. This transducer produced 15 millivolts (mv) output when activated by the transmitter 10 of FIG. 1 placed 40 feet away for this test. This circuit performs well with 15 mv input. Q1 along with R1, R2, R3, C1 & C4 form high gain class A voltage amplifier 24. D2 and D3 rectify the 40 khz signal and C4 is a filter capacitor. C5 and R4 combine to form differentiator 34. Q7 is invertor 36. Q2 and Q3 form the one shot multivibrator 38. The ½ second timing of the one shot is controlled by R6 and C6. C8 and R10 form differentiator B while C7 with R9 form differentiator C. The coincidence gate 44 is implemented by D5 and D6. Q6 is invertor 46. Q4 and Q5 make up the flip-flop 28 while Q4 doubles as the lamp driver 29. R12 controls the LED current which, in this case, is approximately 5 milliamperes. This circuit still performed well when the battery voltage dropped to 2 volts.

Figure 5:
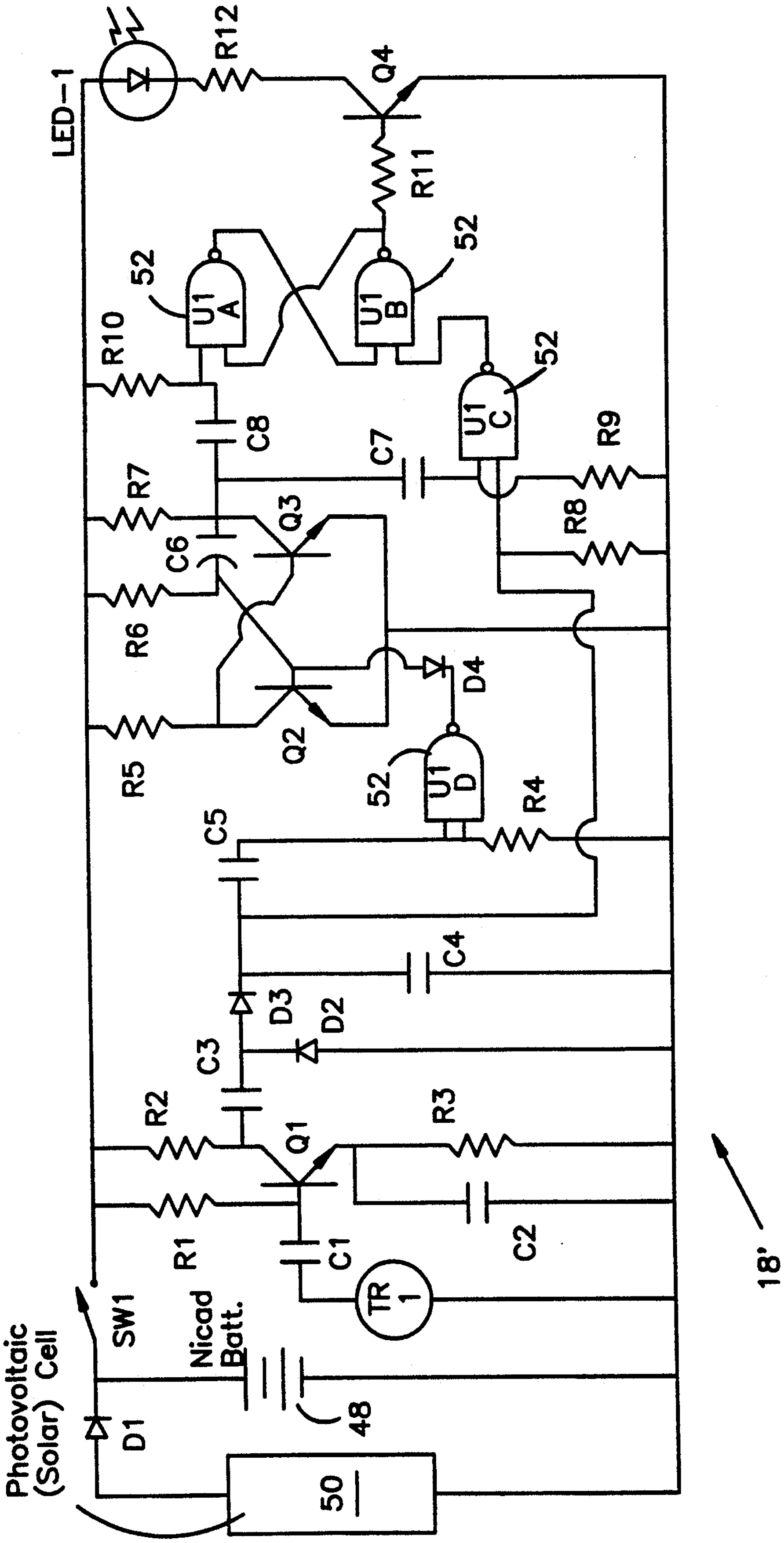
FIG. 5 is a schematic diagram of a second embodiment of an ultrasonic receiver constructed in accordance with FIG. 2.

FIG. 5 is an example of the same receiver and control circuit as FIG. 4 except that a number of discrete components have been replaced by a commonly available quad NAND gate integrated circuit 52. Gates A and B replace Q3 and Q4 and associated circuitry forming the flip-flop 28. Gate C replaces diodes 5 and 6 and transistor Q6 to form the coincidence gate 44 and invertor 46. Gate D replaces Q7 which is invertor 36. This implementation works well and has a reduced number of parts as compared to FIG. 4. Other implementations of this invention are possible. For example, a common IC timer could replace Q2 and Q3 forming the 500 ms multivibrator 38 and an IC amplifier could replace Q1 without departing from the scope and spirit of this invention.

A circuit illustrated in FIG. 5 was designed for low power consumption. This circuit has been tested with the transmitter 10 of FIG. 1, and with a properly tuned mechanical ultrasonic "dog" whistle (not shown) and also has been found to function satisfactory.

While control of lamp 30 by ambient light sensing in accordance with the present invention is primarily intended for outside use, it is useful in conjunction with indoor lighting projections as well. When it is light enough for the photovoltaic, or solar, cell 50 to begin charging the battery 48, the lamp 30 turns off. When it is too dark outside for the photovoltaic cell 50 to charge battery 48, lamp 30 automatically turns on.

Figure 6:
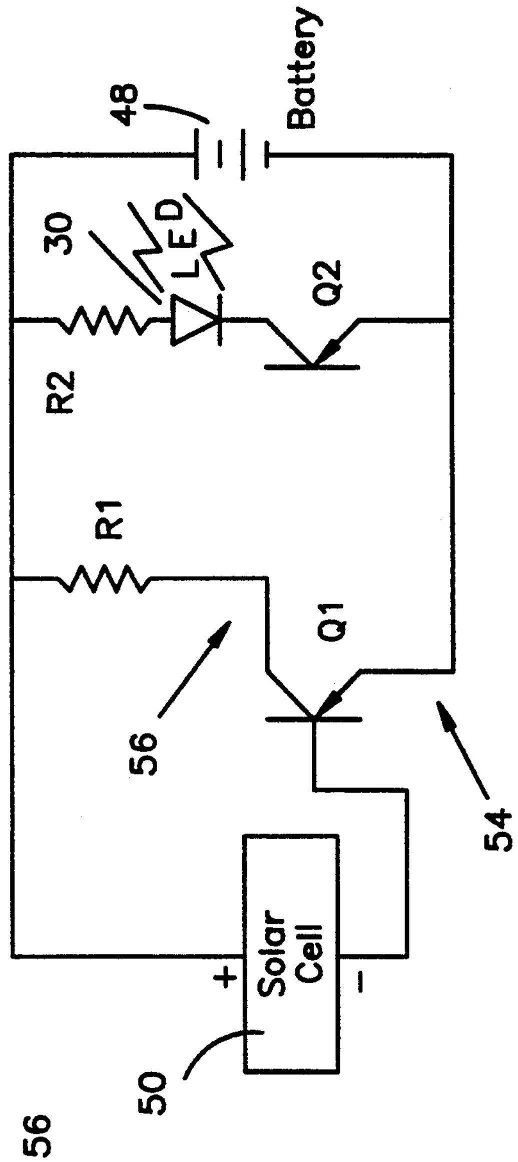
FIG. 6 is a schematic diagram of an ambient light sensing control circuit in accordance with the present invention.
Figure 7:
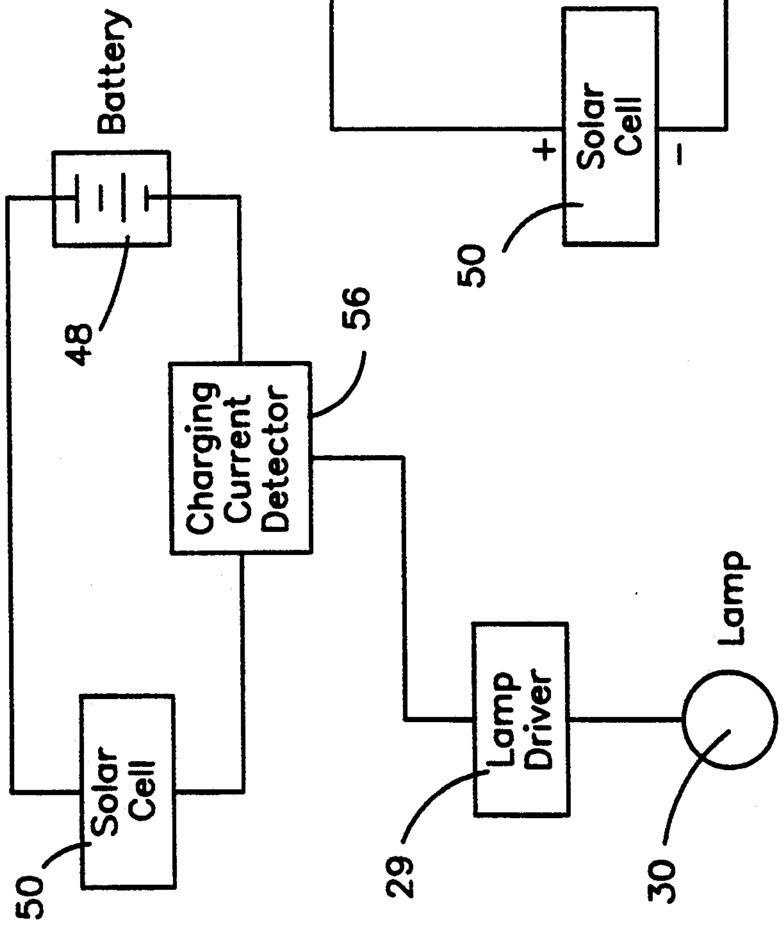
FIG. 7 is a block diagram of the ambient light sensing control circuit of FIG. 6.

Referring now to FIGS. 6 and 7, construction of a preferred embodiment of an ambient light sensing circuit 54 will now be described.

NPN transistor Q2 normally is biased on by a resistor R1. When transistor Q2 is on, the LED forming lamp 30 is lit. The resistor R2 limits current flow into lamp 30 to a predetermined value, with 5 ma having been found satisfactory in a test. An emitter-base junction of a PNP transistor Q1 acts as an isolation diode so the battery 48 will not discharge through the photovoltaic cell 50 when it is too dark for battery 28 to be charged by photovoltaic cell 50. When a charging current does flow through the emitter-base junction of the PNP transistor Q1, it turns on transistor Q1 and causes the PNP transistor Q2 to turn off. Turning off transistor Q2 in turn causes the lamp 30 to turn off. Transistors Q1 and Q2 form a charging current detector 56 which can be connected directly to the lamp driver 29 of FIG. 2, as seen in FIG. 7.

Receiver circuits such as illustrated in FIGS. 4 and 5 can be incorporated into a Christmas tree ornament, and the like, by using conventional techniques. An example of such an ornament construction can be found in U.S. Pat. No. 4,866,580, issued Sep. 12, 1989 to C. Blackerby.

Figure 8:
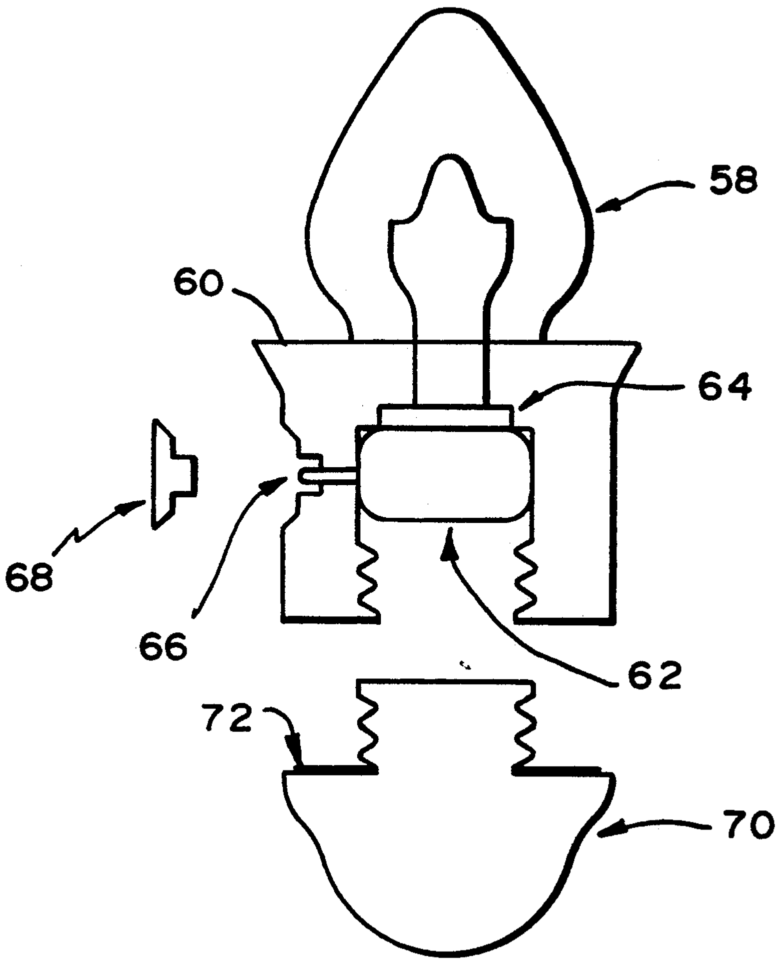
FIG. 8 is a schematic view, partly in cross section of the light assembly including a self contained power source.

FIG. 8 illustrates a self contained light fixture, such as a Christmas tree light. The light fixture 58 includes a housing 60 within which a rechargeable battery 62 and a circuit chip 64 are mounted. A recharging pin 66 and a solar cell 68 are also included as shown for recharging the battery 62. A cap 70 is threadly engaged with the housing 60 for easy access to the battery 62 and circuit chip 64. A rubber seal 72 is provided as shown to prevent moisture from entering the housing 60. The circuit chip 64 includes the circuitry noted above.

As can be readily understood from the above description and from the drawings, a control system for self-powered ornamental lights, and the like, constructed in accordance with the present invention permits decorative lights to be deployed in a safe, efficient, and practical manner. The system permits individual lights to be turned on or off without affecting lights already in the opposite mode, and the ambient light sensing feature eliminates the need for a user of the lights to remember to turn the lights on and off at appropriate times such as evening and morning.

What I claim is:

1. In combination with a lamp, a remote control system comprising:
(a) transducer means for receiving radiation signals of varying lengths and emitting signals corresponding in length to the signals received;
(b) bistable switch means connected to the lamp for oscillating between an "on" mode energizing the lamp and an "off" mode deenergizing the lamp;
(c) detector means connected between the transducer means and the switch means for resetting same to the "off" mode when a signal received from the transducer means lasts less than a predetermined length of time;
(d) comparison means connected between the transducer means and the switch means for setting same to the "on" mode when a signal received from the transducer means lasts longer than the predetermined length of time; and
(e) transmitter means for sending signals of varying lengths to the transducer means, wherein the transducer means includes an ultrasonic transducer, a high gain voltage amplifier connected to the transducer, and a rectifier and filter means connected to the amplifier for receiving an amplified signal therefrom and emitting a pulse whose duration is a function of the duration of a transducer signal.

2. A combination as defined in claim 1, wherein the bistable switch means comprises a reset-set flip-flop.

3. A combination as defined in claim 2, wherein the detector means includes differentiator means connected to the transducer means for detecting transduced signals from the transducer means, and monostable multivibrator means connected to the differentiator means for generating a signal of predetermined length only on receiving a pulse of predetermined polarity from the differentiator means.

4. A combination as defined in claim 3, wherein the detector means further includes invertor means inserted between and connected to the differentiator means and the monostable multivibrator means for inverting a signal received from the differentiator means.

5. A combination as defined in claim 3, wherein the detector means further includes dual differentiator means connected to an output of the monostable multivibrator means and to the switch means and the comparison means for feeding a signal from an output of the monostable multivibrator means to each of the switch means and the comparison means.

6. In combination with a lamp, a remote control system comprising:
(a) transducer means for receiving radiation signals of varying lengths and emitting signals corresponding in length to the signals received;
(b) bistable switch means connected to the lamp for oscillating between an "on" mode energizing the lamp and an "off" mode deenergizing the lamp;
(c) detector means connected between the transducer means and the switch means for resetting same to the "off" mode when a signal received from the transducer means lasts less than a predetermined length of time; and
(d) comparison means connected between the transducer means and the switch means for setting same to the "on" mode when a signal received from the transducer means lasts longer than the predetermined length of time, wherein the comparison means includes a coincidence gate having a pair of inputs, one of the inputs connected to the transducer means and the other of the inputs connected to an output of the detector means, and having an output connected to the switch means for setting the switch means when both input signals to the coincidence gate are the same.

7. A combination as defined in claim 6, wherein the comparison means further includes invertor means connected to the coincidence gate and to the switch means for inverting a signal from the coincidence gate.

8. In combination with a lamp, a remote control system comprising:
(a) transducer means for receiving radiation signals of varying lengths and emitting signals corresponding in length to the signals received;
(b) bistable switch means connected to the lamp for oscillating between an "on" mode energizing the lamp and an "off" mode deenergizing the lamp;
(c) detector means connected between the transducer means and the switch means for resetting same to the "off" mode when a signal received from the transducer means lasts less than a predetermined length of time;
(d) comparison means connected between the transducer means and the switch means for setting same to the "on" mode when a signal received from the transducer means lasts longer than the predetermined length of time;
(e) power source means including a rechargeable battery means connected to the lamp for energizing same when the switch means is in an "on" mode;
(f) photovoltaic cell means connected to the battery means for charging the same whenever ambient light is sufficient to activate the cell means; and
(g) an ambient light sensing means inserted between the photovoltaic cell means and the battery means and connected to the switch means for turning the switch means to an "off" mode when the photovoltaic cell means is sending current to the battery means.

9. A combination as defined in claim 8, wherein the ambient light sensing means comprises a PNP transistor means having a base connected to the photovoltaic cell means and an emitter connected to the battery means for creating an isolation diode to prevent the battery means from discharging through the photovoltaic cell means whenever the photovoltaic cell means receives insufficient light to charge the battery means, and a PNP transistor means having a base connected to a collector of the PNP transistor means, an emitter connected to the battery means, and a collector connected to the lamp for being turned off by current flow through the emitter and base of the PNP transistor means.

10. A combination as defined in claim 8, further comprising power source means including a rechargeable battery means connected to the lamp for energizing same when the switch means is in an "on" mode; photovoltaic cell means connected to the battery means for charging the same whenever ambient light is sufficient for the purpose; and an ambient light sensing means inserted between the photovoltaic cell means and the battery means and connected to the switch means for turning the switch means to an "off" mode when the photovoltaic cell means is sending current to the battery means.

11. Apparatus as defined in claim 10, further comprising load means connected to the bistable switch means for being energized and deenergized by the bistable switch means.

12. In combination with a lamp, remote control system comprising:

(a) transducer means for receiving radiation signals of varying lengths and emitting signals corresponding in length to the signals received;

(b) bistable switch means connected to the lamp for oscillating between an "on" mode energizing the lamp and an "off" mode deenergizing the lamp;

(c) detector means connected between the transducer means and the switch means for resetting same to the "off" mode when a signal received from the transducer means lasts less than a predetermined length of time;

(d) comparison means connected between the transducer means and the switch means for setting same to the "on" mode when a signal received from the transducer means lasts longer than the predetermined length of time; and (e) transmitter means for sending signals of varying lengths to the transducer means, wherein the transducer means includes an ultrasonic transducer, a high gain voltage amplifier connected to the transducer, and a rectifier and filter means connected to the amplifier for receiving an amplified signal therefrom and emitting a pulse whose duration is a function of a duration of a transduced signal, and wherein the bistable switch means comprises a reset-set flip-flop.

13. A combination as defied in claim 12, wherein the detector means includes differentiator means connected to the transducer means for detecting transduced signal from the transducer means, and monostable multivibrator means connected to a differentiator means for generating a signal of predetermined length only on receiving a pulse of predetermined polarity from the differentiator means, the detector means further including dual differentiator means connected to monostable multivibrator means and to the switch means and the comparison means for feeding a signal from the monostable multivibrator means to each of the switch means and the comparison means.

14. A combination as defined in claim 13, wherein the comparison means includes a coincidence gate having an input connected to the transducer means and to the output of the monostable multivibrator means, and an output connected to the switch means for setting the switch means when both input signals to the coincidence gate are the same.

* * * * *